US012752730B2

(12) United States Patent
Lanini et al.

(10) Patent No.: US 12,752,730 B2

(45) Date of Patent: Oct. 6, 2026

(54) VEHICLE GRILL GUARD HAVING A RELEASABLE FOLD-DOWN CENTER ASSEMBLY

(71) Applicant: Westin Automotive Products, Inc., San Dimas, CA (US)

(72) Inventors: Jeremy Young Lanini, Alta Loma, CA (US); Jake Michael Eggan, Azusa, CA (US); Carlos David Laguna, Bishop, CA (US); Jose Eduardo Lopez Moctezuma, La Mirada, CA (US)

(73) Assignee: Westin Automotive Products, Inc., San Dimas, CA (US)

( * ) Notice: Subject to any disclaimer, the term of this patent is extended or adjusted under 35 U.S.C. 154(b) by 389 days.

(21) Appl. No.: 18/370,522

(22) Filed: Sep. 20, 2023

(65) Prior Publication Data

US 2024/0140340 A1 May 2, 2024

Related U.S. Application Data

(60) Provisional application No. 63/419,553, filed on Oct. 26, 2022.

(51) Int. Cl.
*B60R 19/52* (2006.01)

(52) U.S. Cl.
CPC ........ *B60R 19/52* (2013.01); *B60R 2019/522* (2013.01)

(58) Field of Classification Search
USPC .......................................................... 293/115
See application file for complete search history.

(56) References Cited

U.S. PATENT DOCUMENTS

| | | | | |
|---|---|---|---|---|
| 2,880,016 A * | 3/1959 | Peterson | B60R 19/52 | D12/171 |
| 4,125,214 A * | 11/1978 | Penn | B60R 9/06 | 224/42.08 |
| 6,447,032 B1 * | 9/2002 | Howell, Sr. | B60R 19/52 | 224/489 |
| 9,481,308 B2 * | 11/2016 | Dringenberg | B60R 3/02 | |
| 2009/0212581 A1 * | 8/2009 | Drever | B60R 19/52 | 293/115 |

* cited by examiner

*Primary Examiner* — Amy R Weisberg
*Assistant Examiner* — Philip C Adams
(74) *Attorney, Agent, or Firm* — Jenny Lee

(57) ABSTRACT

The present invention provides a grill guard for a vehicle comprising a grill structural frame and a releasably fold down center assembly having a center structural frame and a latching assembly wherein the grill guard is attached to front of the vehicle by the grill structural frame; and the center assembly is attached to the grill structural frame and can be released and folded down by the latching assembly while the grill structural frame remains fixed in its original location attached to the front of the vehicle.

12 Claims, 17 Drawing Sheets

VEHICLE GRILL GUARD HAVING A RELEASABLE FOLD-DOWN CENTER ASSEMBLY

FIELD OF INVENTION

The present invention relates to a vehicle grill guard. More specifically, it relates to a vehicle grill guard having a releasable fold-down center assembly that assists users to conveniently access the front area of a vehicle.

BACKGROUND OF INVENTION

A grill guard not only improves the appearance of a vehicle but also protects the vehicle's front end from potential damages from the environment such as rocks, plants, and other matters that can be kicked up by other vehicles. Furthermore, the grill guard may prevent injuries during an accident with another vehicle or when hitting an animal. The disadvantage of a conventional grill guard is potential blockage of access to the front area of the vehicle (e.g., front hood, access to front engine, etc.) hereinafter referred to as "Front Vehicle Area"). In an effort to alleviate this access problem, an entire grill guard was designed to pivot away from the front of the vehicle. See U.S. Pat. No. 9,114,771. Pivoting the entire grill guard from the front of the vehicle is not ideal because of the grill guard's significant weight and the space created by such pivot likely will still limit a user's easy access to certain portions of the Front Vehicle Area. The grill guard of the present invention having a releasable fold-down center assembly that provides quick and easy access to the Front Vehicle Area by allowing only the center assembly to be released and folded-down while keeping the grill guard's remaining structural frame in place.

BRIEF DESCRIPTION OF THE DRAWING

The present invention will be more clearly understood when considering the accompanying drawing of which.

DESCRIPTION OF THE PREFERRED EMBODIMENT

Figure 1:
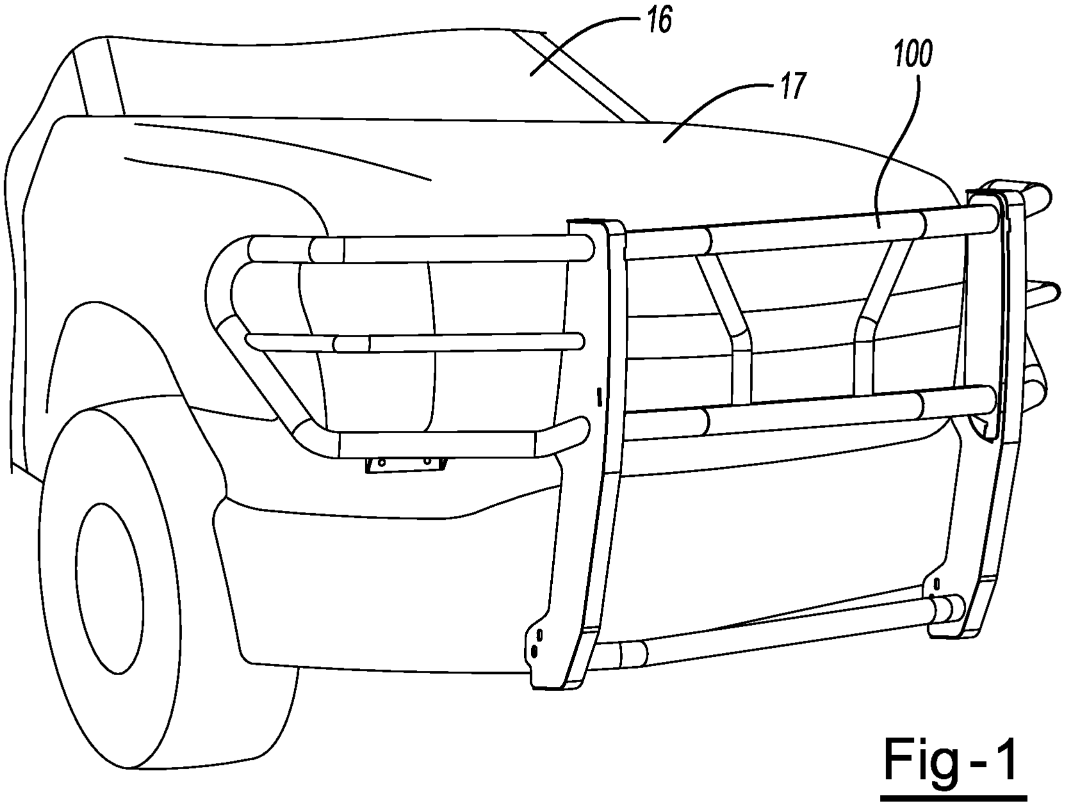
FIG. 1 schematically depicts front perspective view illustrating a grill guard of the present invention having a releasable fold-down center assembly wherein the grill guard is attached to the front of a vehicle.

Referring to FIGS. 1-21, the present invention provides a vehicle grill guard 100 having a grill structural frame 10 and a releasable fold-down center assembly 12. The grill structural frame 10 includes vehicle mounting features 14 configured for firmly attaching the grill structural frame 10 to front of a vehicle 16. The vehicle mounting features 14 can be any art-disclosed suitable mounting features (e.g., mounting brackets 18 and/or mounting surfaces 20 having apertures 22 configured to accept conventional fasteners such as nuts and bolts, or the like). The grill structural frame 10 further includes two structural members 24 connected to a grill member 26 and optional side wing structures 28. The two structural members 24 are positioned in a generally vertical direction. The grill structural frame 12 can be formed as a single continuous structure. Alternatively, the components of the grill structural frame 12 (e.g., the structural members 24, the grill member 26, and the side wing structures 28) can be connected together using art-disclosed means such as welding, fasteners, or the like. Moreover, the grill structural frame 10 can encompass a variety of art-disclosed sizes, shapes, and configurations (e.g., single loop, double loops, or the like along with the exemplary embodiment shown in FIG. 5).

Figure 2:
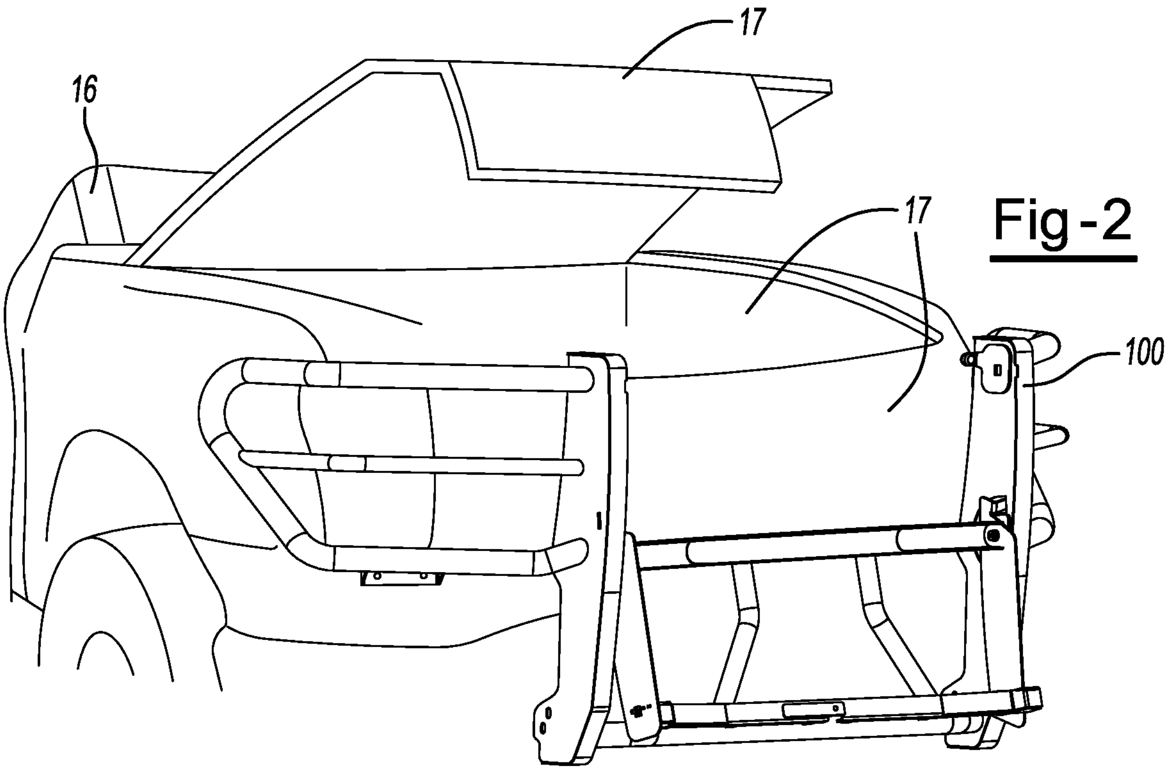
FIG. 2 schematically depicts the same front perspective view of the same components as FIG. 1 except that the front hood of the vehicle is opened and the center assembly is released and folded down (i.e., in a released configuration)
Figure 3:
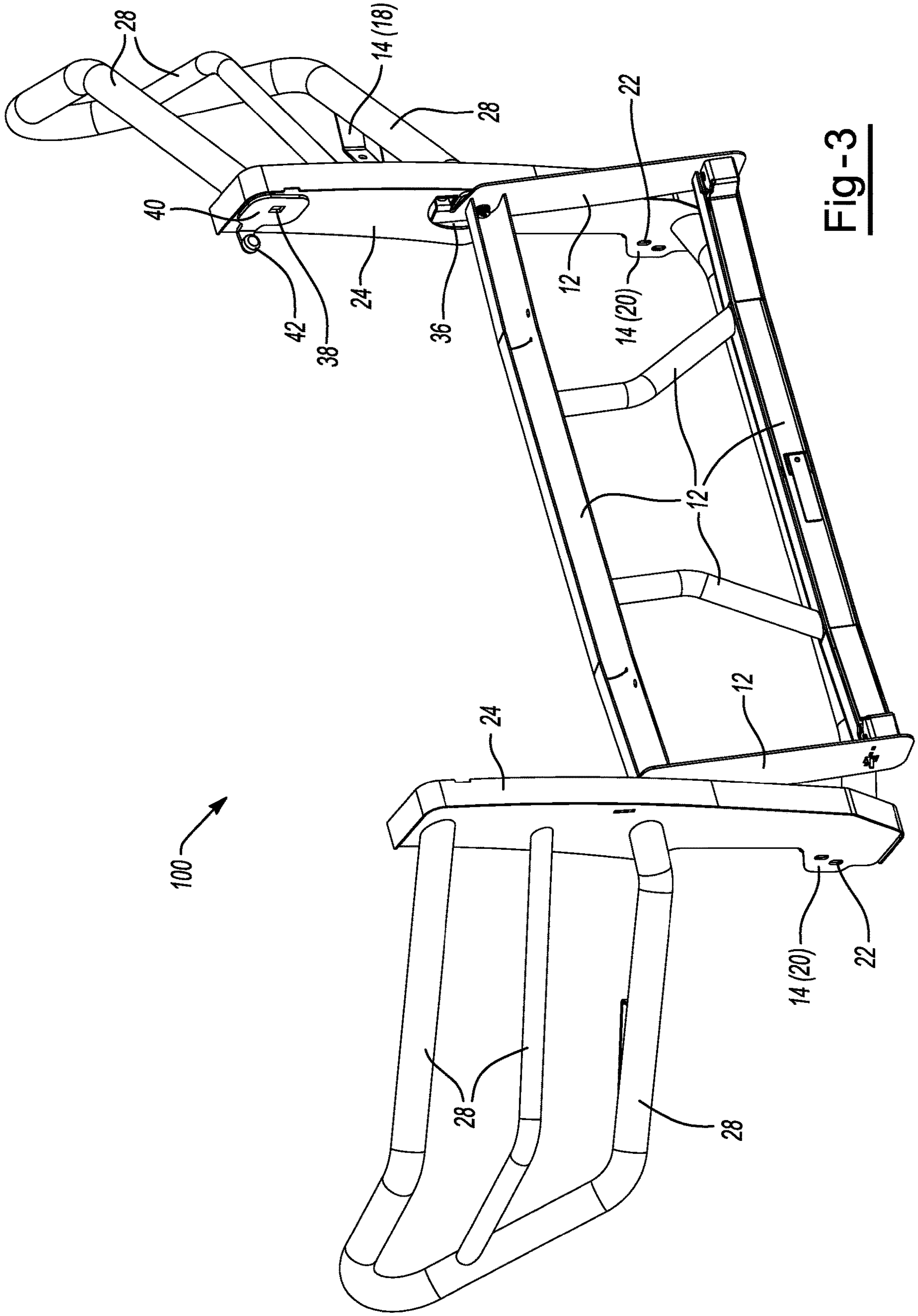
FIG. 3 schematically depicts a front perspective view of the grill guard shown in FIG. 1 with the center assembly in the released configuration.
Figure 4:
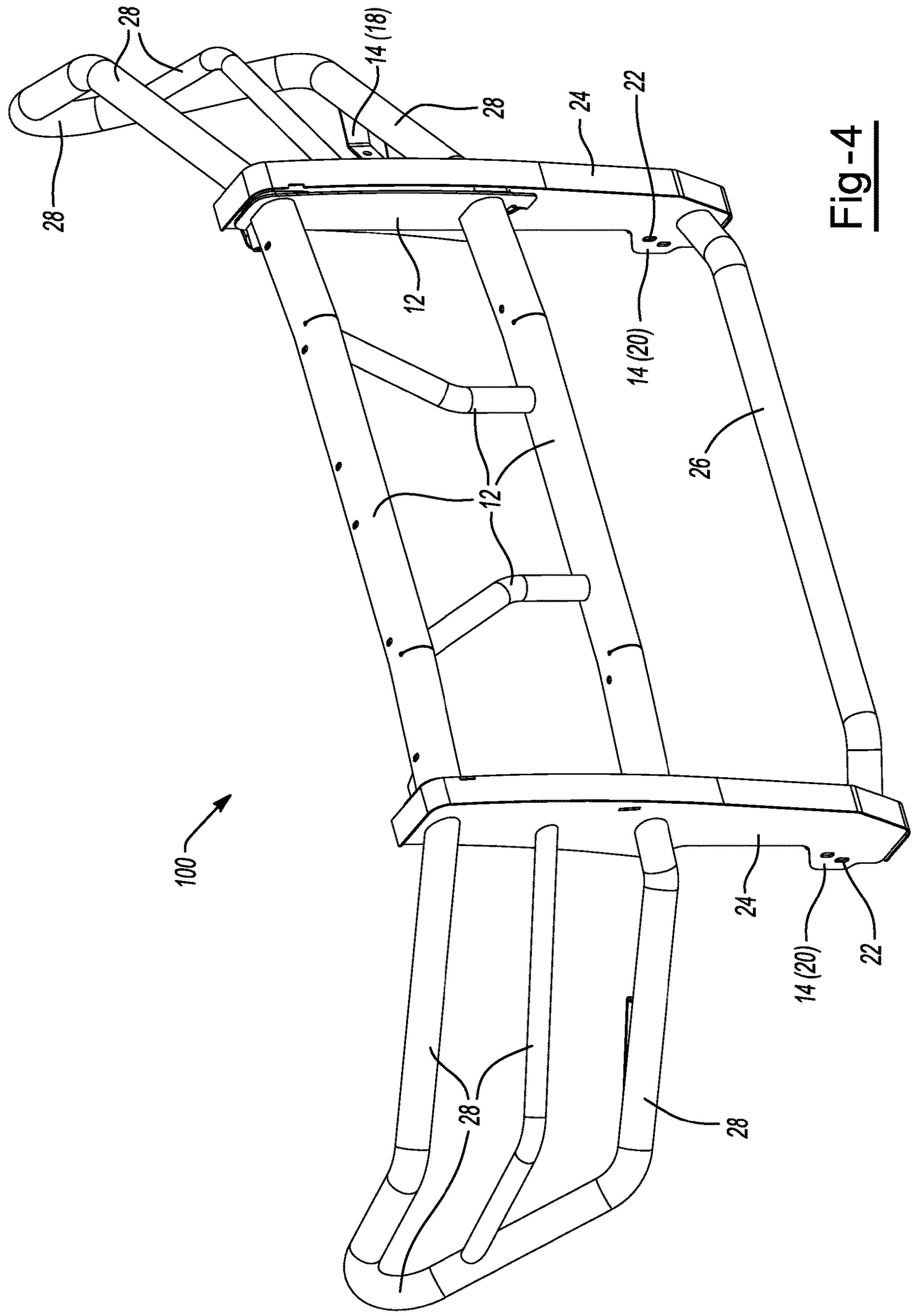
FIG. 4 schematically depicts the same view as FIG. 3 except that the center assembly is not released nor folded down (i.e., in a non-released configuration)

Referring to FIGS. 5-6 and 19-21, the center assembly 12 includes a center structural frame 30 and a latching assembly 32 that removably/releasably engages with latching features 34 and pivot features 36 of the structural members 24. The latching assembly 32 is housed in the center structural frame 30. The center structural frame 30 can encompass a variety of art-disclosed sizes, shapes, and configurations including but not limited to the configuration shown in FIG. 6. When the center assembly 12 is in a non-released configuration (i.e., not released and folded down) as shown in FIGS. 4, 8, 10, 12, 14, 16, and 18-19, the center assembly 12 is retained by the latching assembly's 32 engagement with the latching features 34 of the structural members 24. When the center assembly 12 is in a released configuration (i.e., released and folded down) as shown in FIGS. 3, 7, 11, 13, 15, 17, and 21, the latching assembly 32 is released/disengaged from the latching features 34 and with the assistance of the pivot features 36, the center assembly 12 pivots downward to allow easy access to the Front Vehicle Area 17 of the vehicle 16 as shown in FIG. 2.

Figure 6:
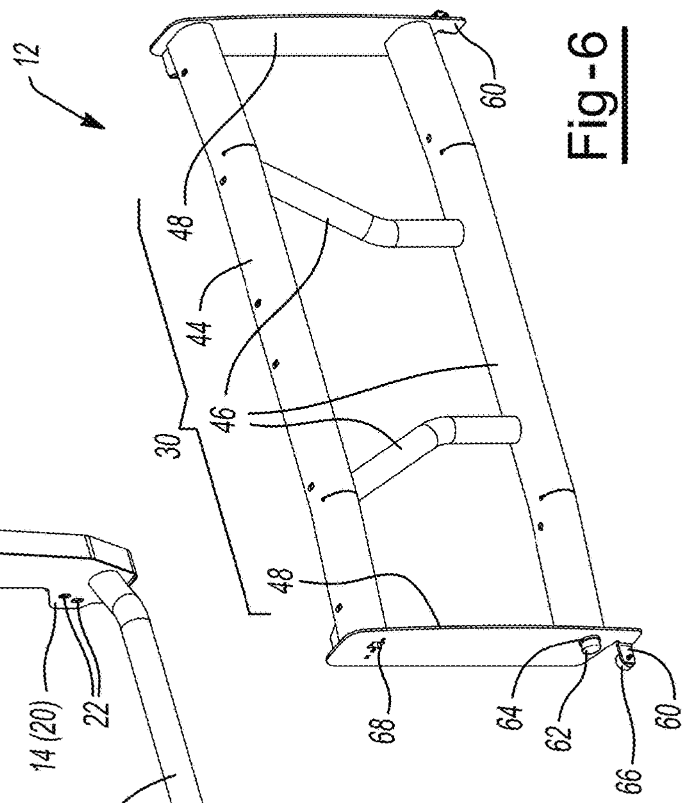
FIG. 6 schematically depicts a front perspective view of the center assembly of the grill guard shown in FIG. 4.
Figure 7:
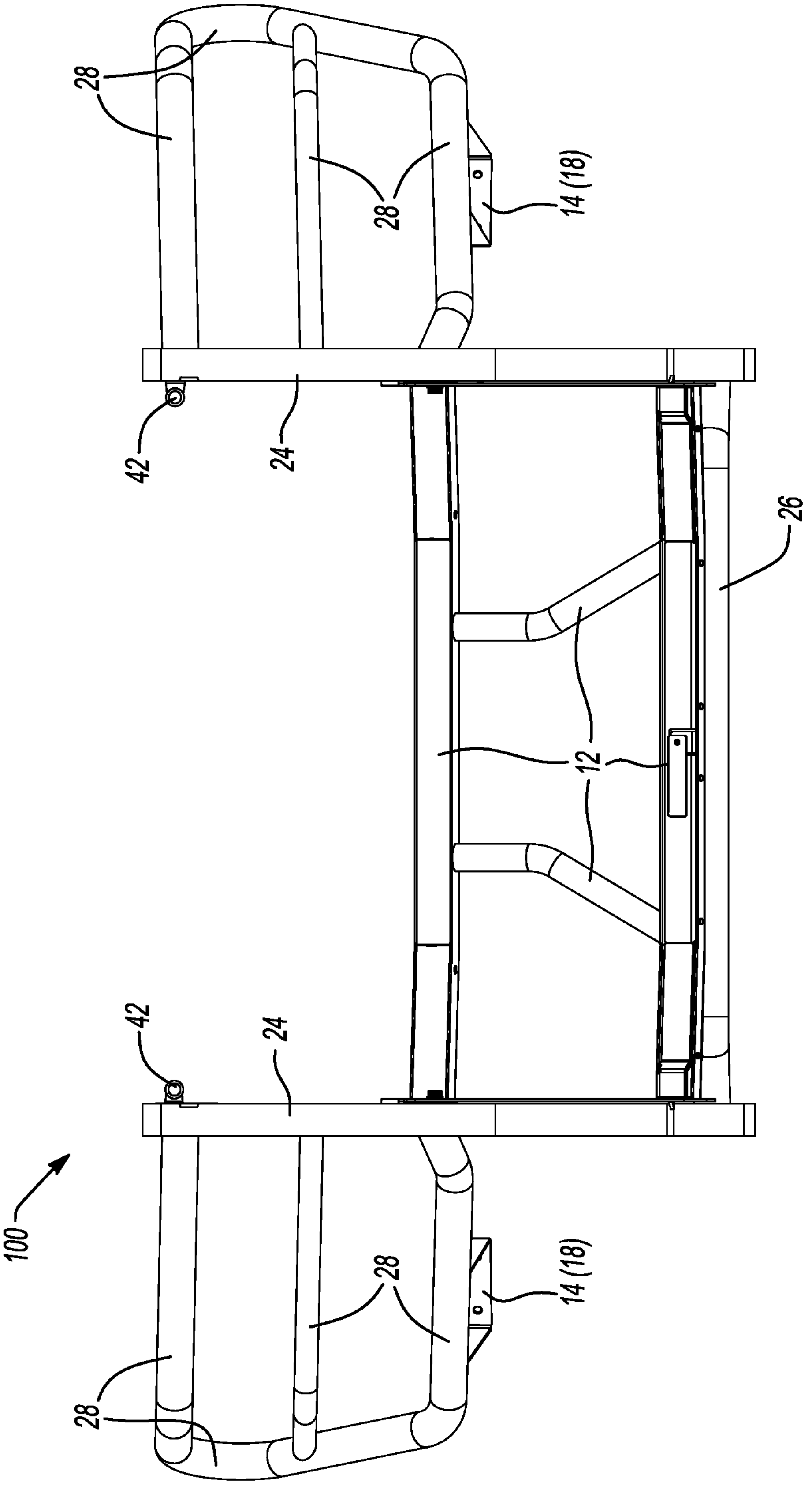
FIG. 7 schematically depicts a front view of the grill guard shown in FIG. 3.
Figure 8:
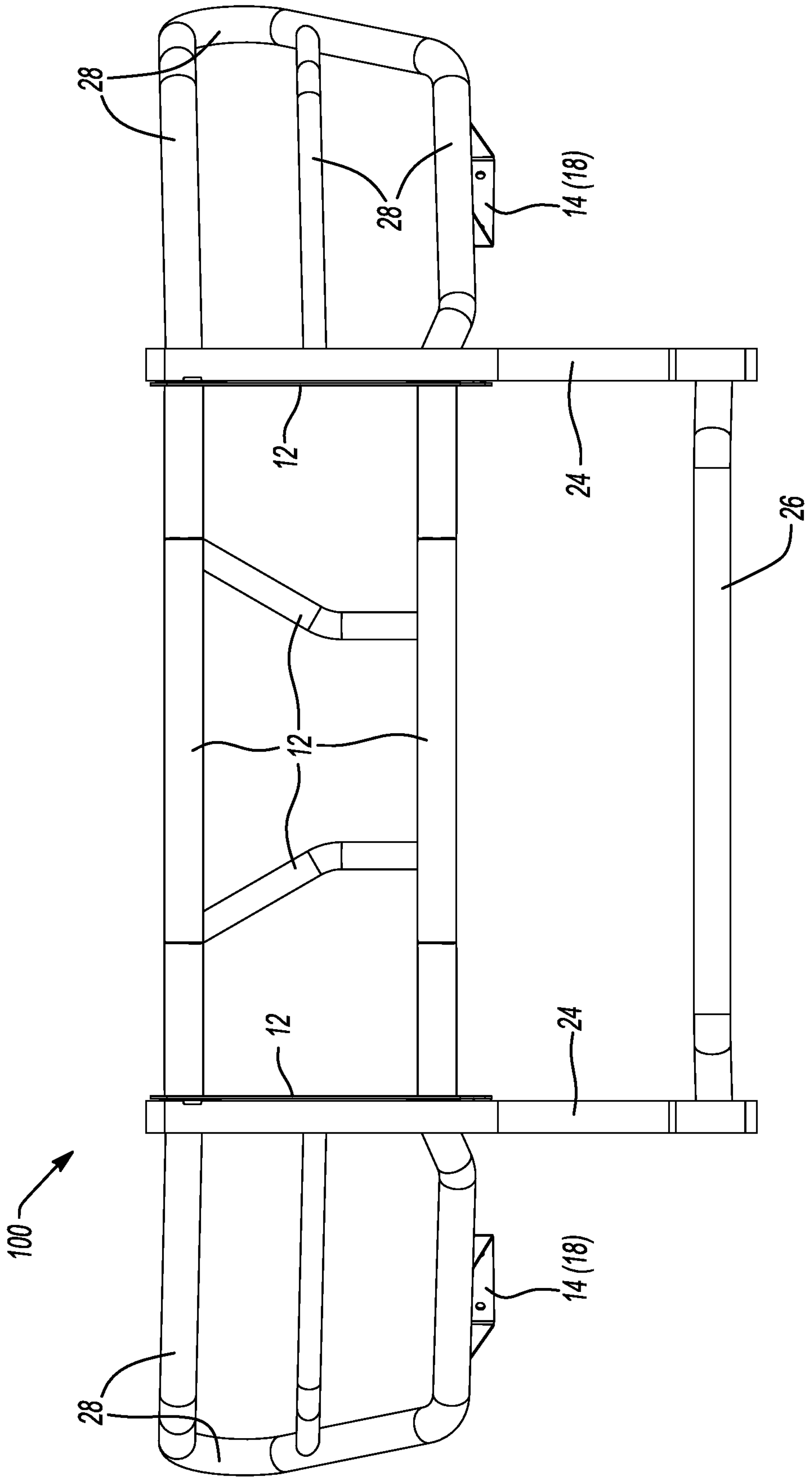
FIG. 8 schematically depicts a front view of the grill guard shown in FIG. 4.
Figure 9:
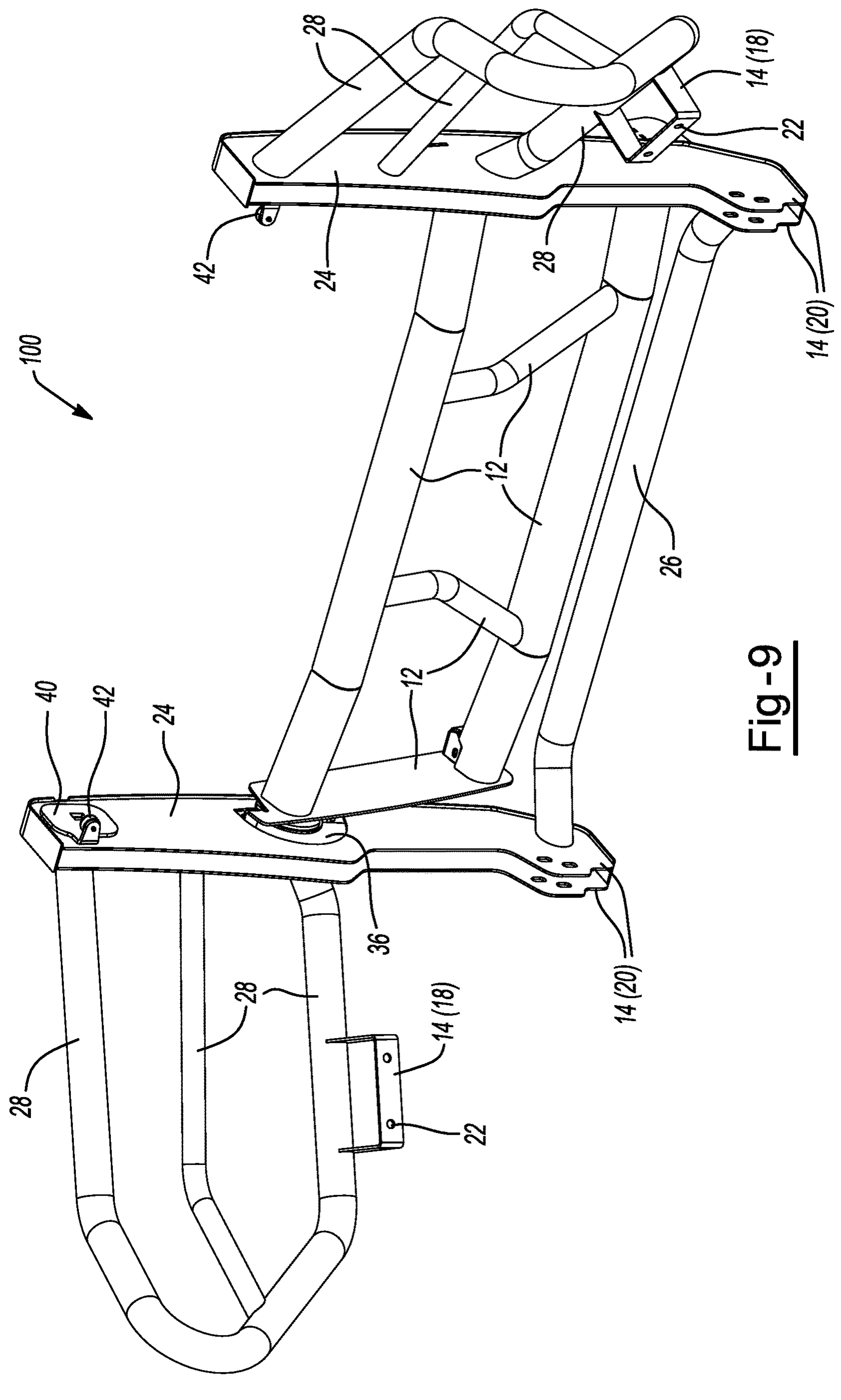
FIG. 9 schematically depicts a rear perspective view of the grill guard shown in FIG. 3.
Figure 10:
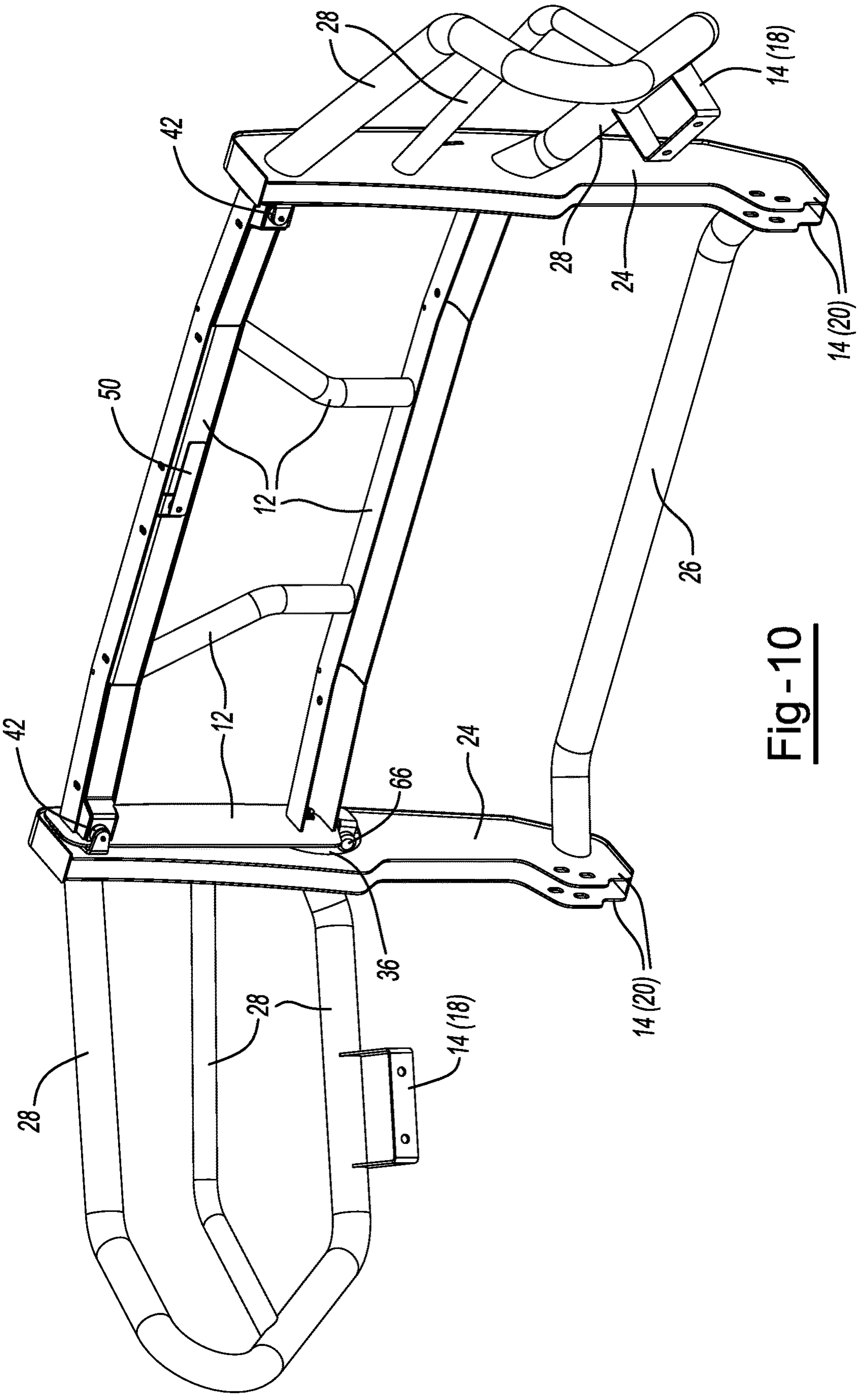
FIG. 10 schematically depicts a rear perspective view of the grill guard shown in FIG. 4.
Figure 11:
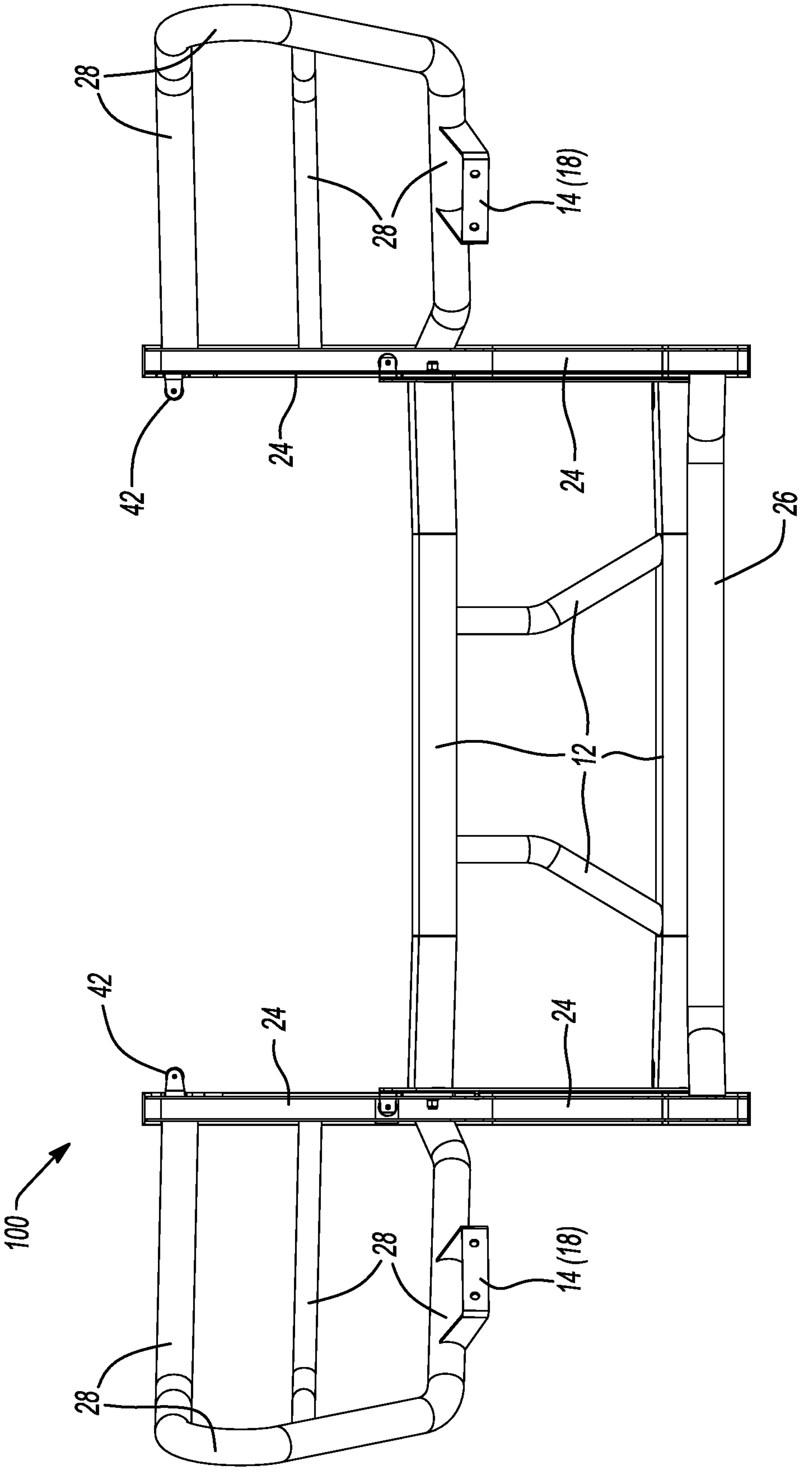
FIG. 11 schematically depicts a rear view of the grill guard shown in FIG. 3.
Figure 12:
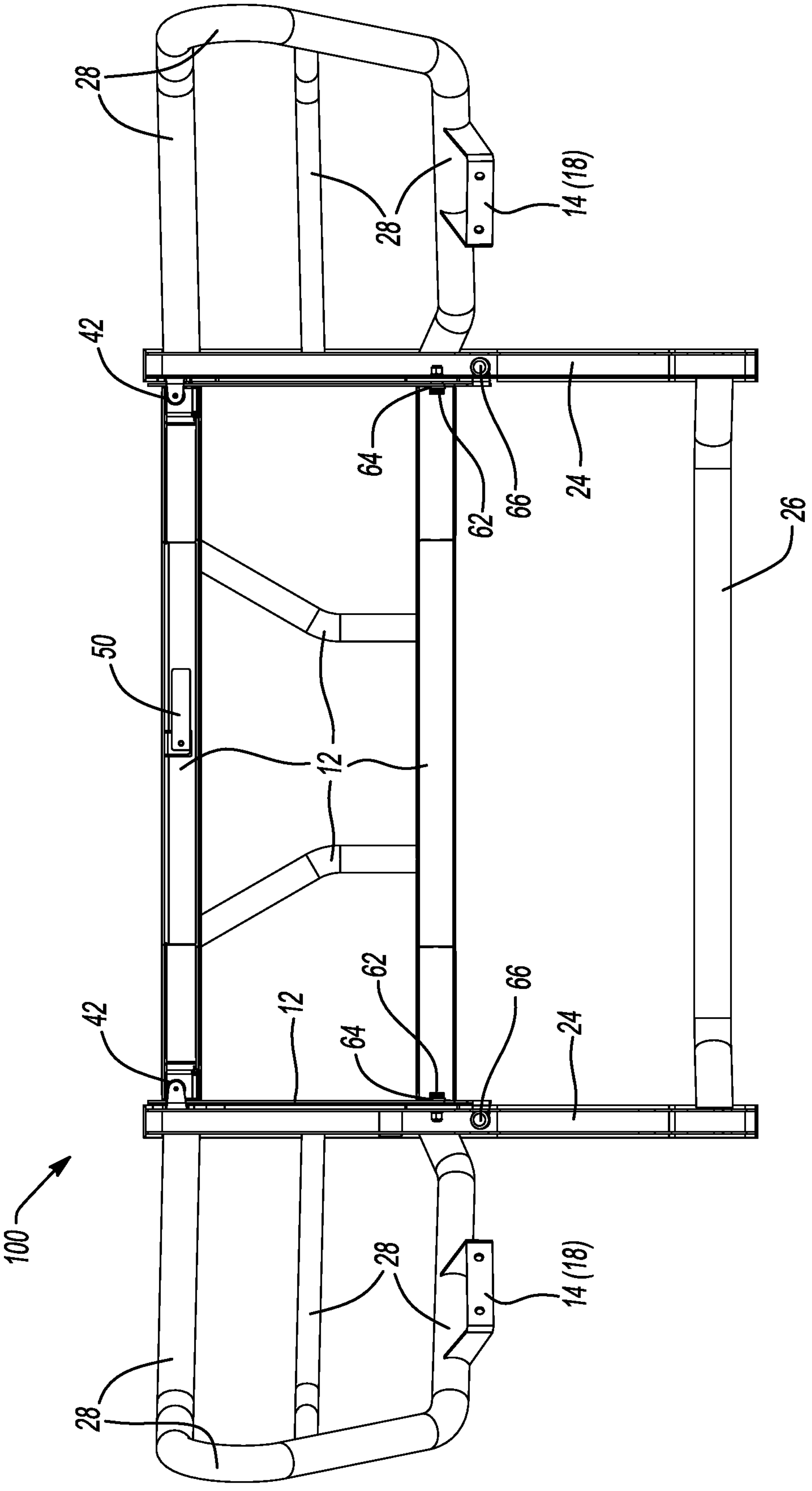
FIG. 12 schematically depicts a rear view of the grill guard shown in FIG. 4.
Figure 14:
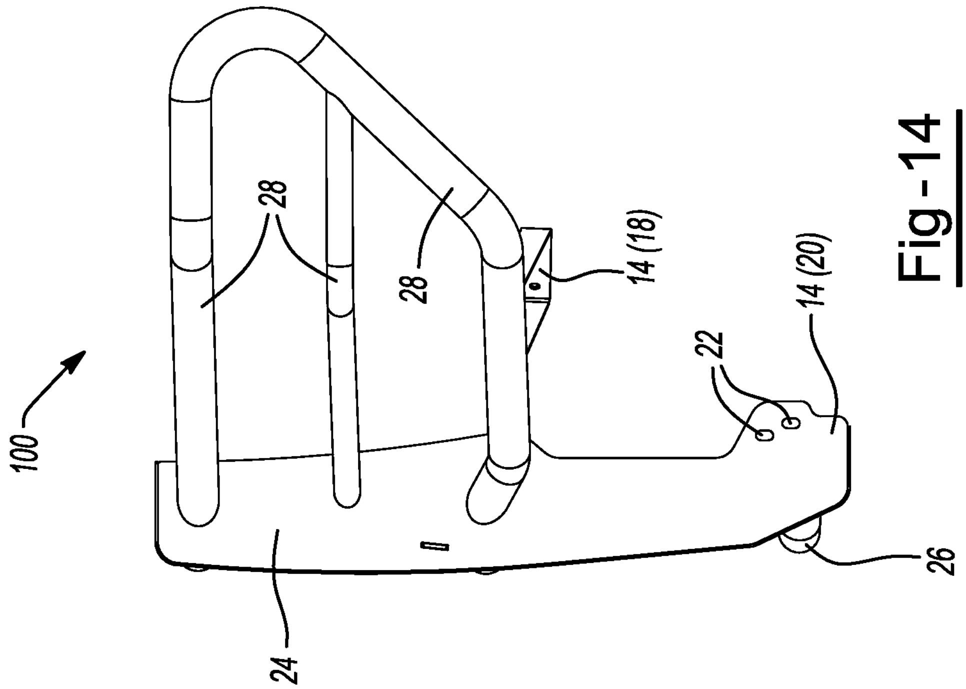
FIG. 14 schematically depicts a side view of the grill guard shown in FIG. 4.
Figure 13:
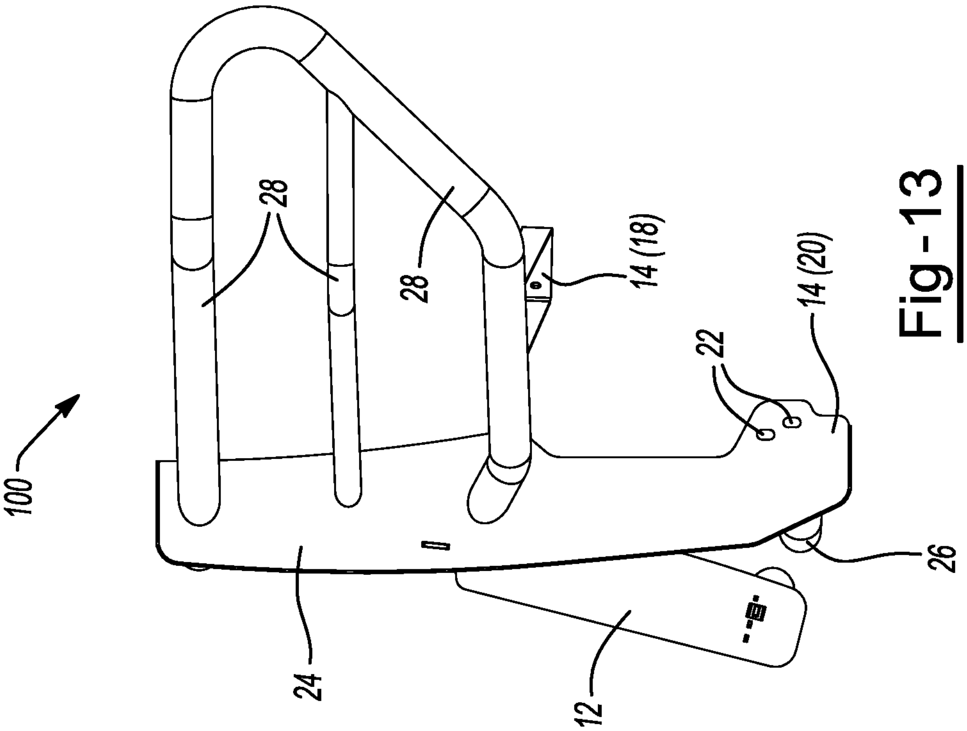
FIG. 13 schematically depicts a side view of the grill guard shown in FIG. 3.
Figure 15:
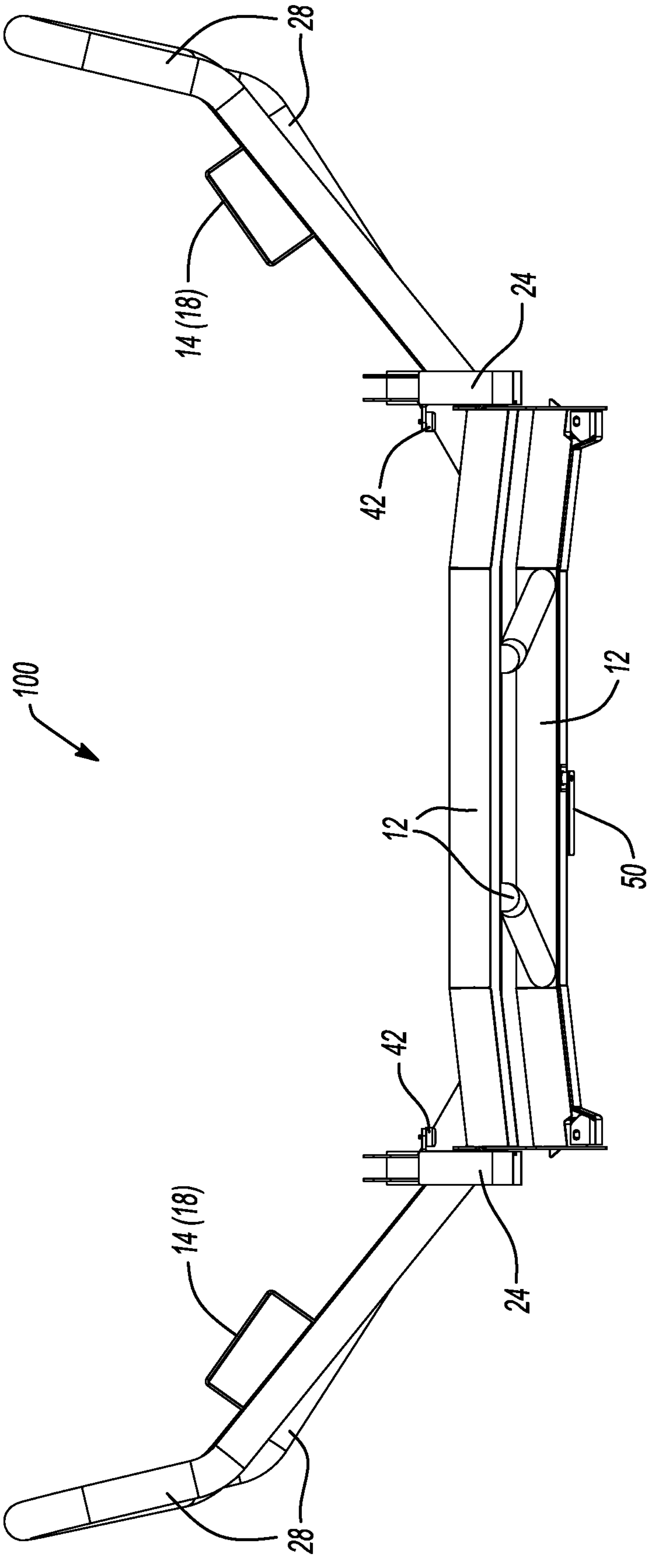
FIG. 15 schematically depicts a top view of the grill guard shown in FIG. 3.
Figure 16:
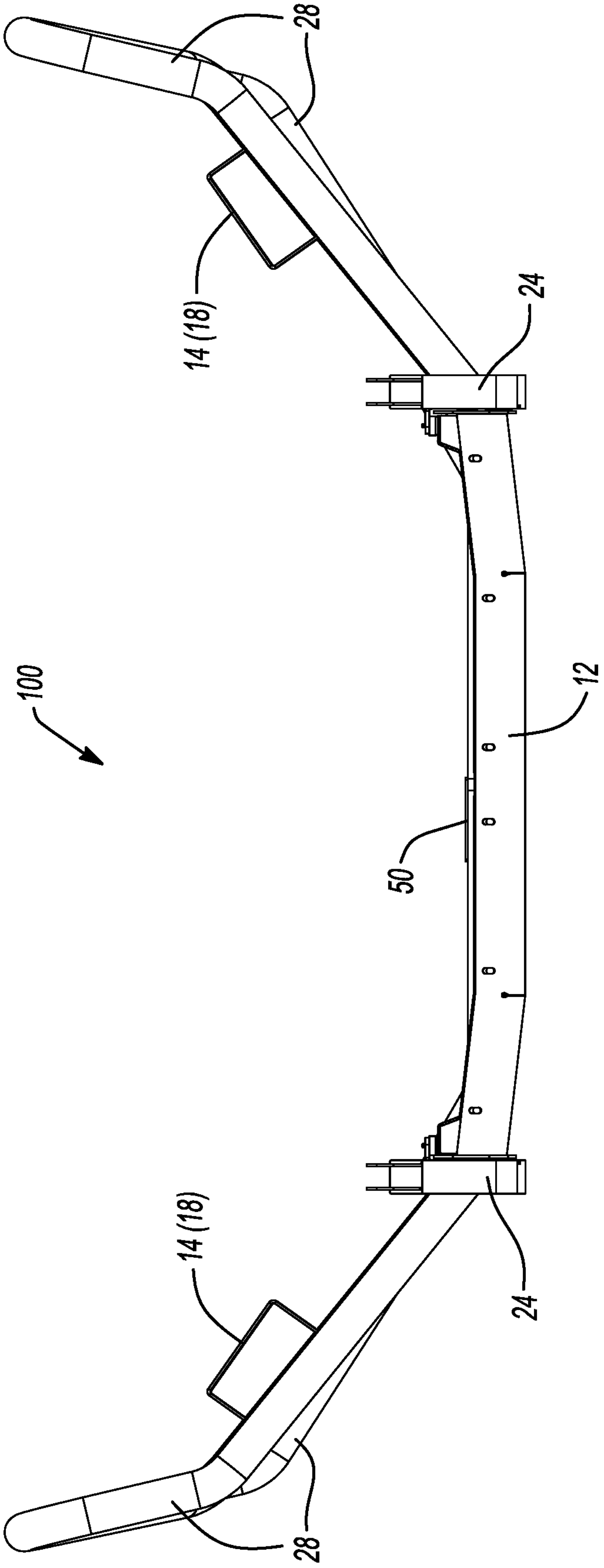
FIG. 16 schematically depicts a top view of the grill guard shown in FIG. 4.
Figure 17:
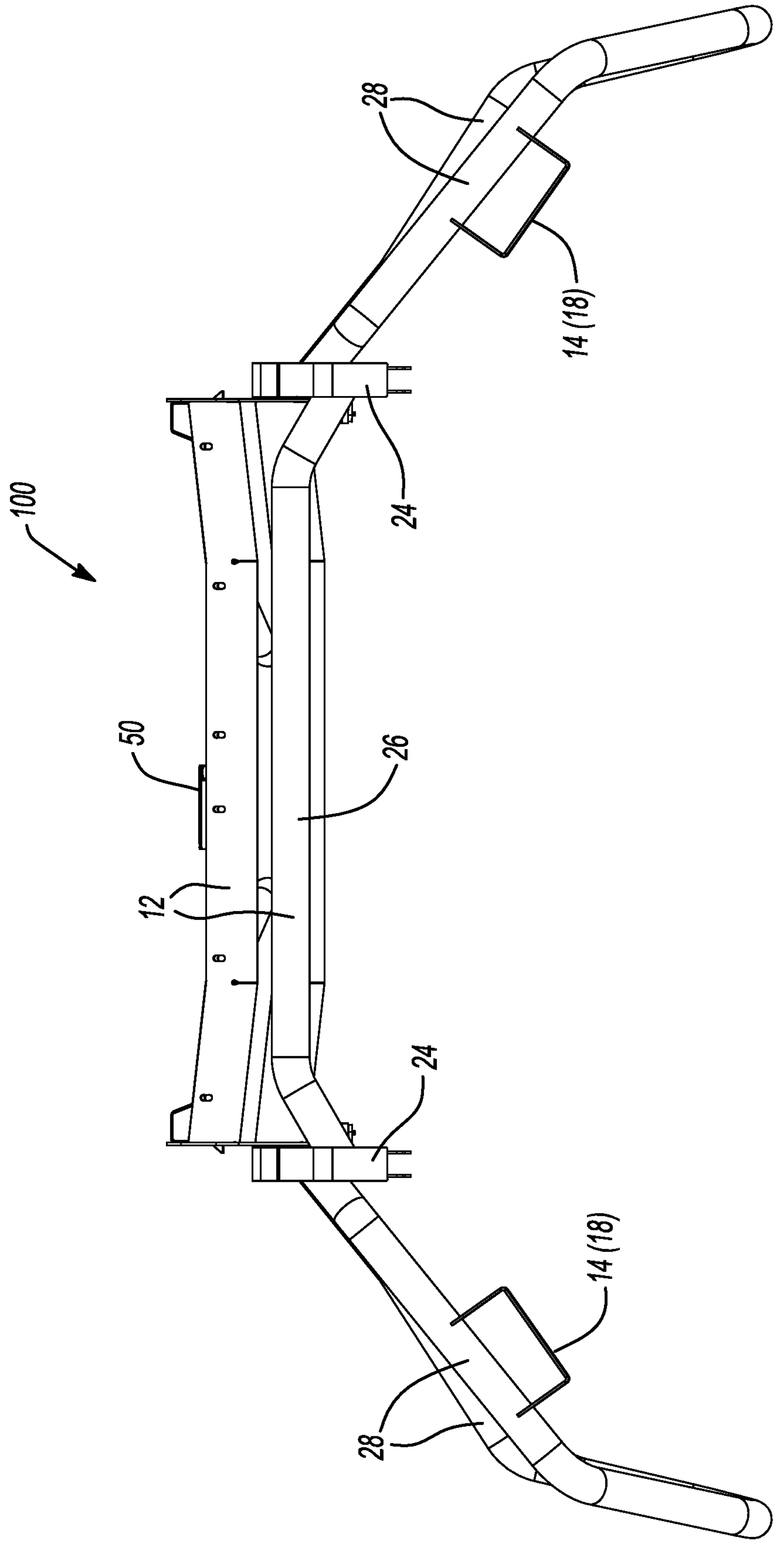
FIG. 17 schematically depicts a bottom view of the grill guard shown in FIG. 3.
Figure 18:
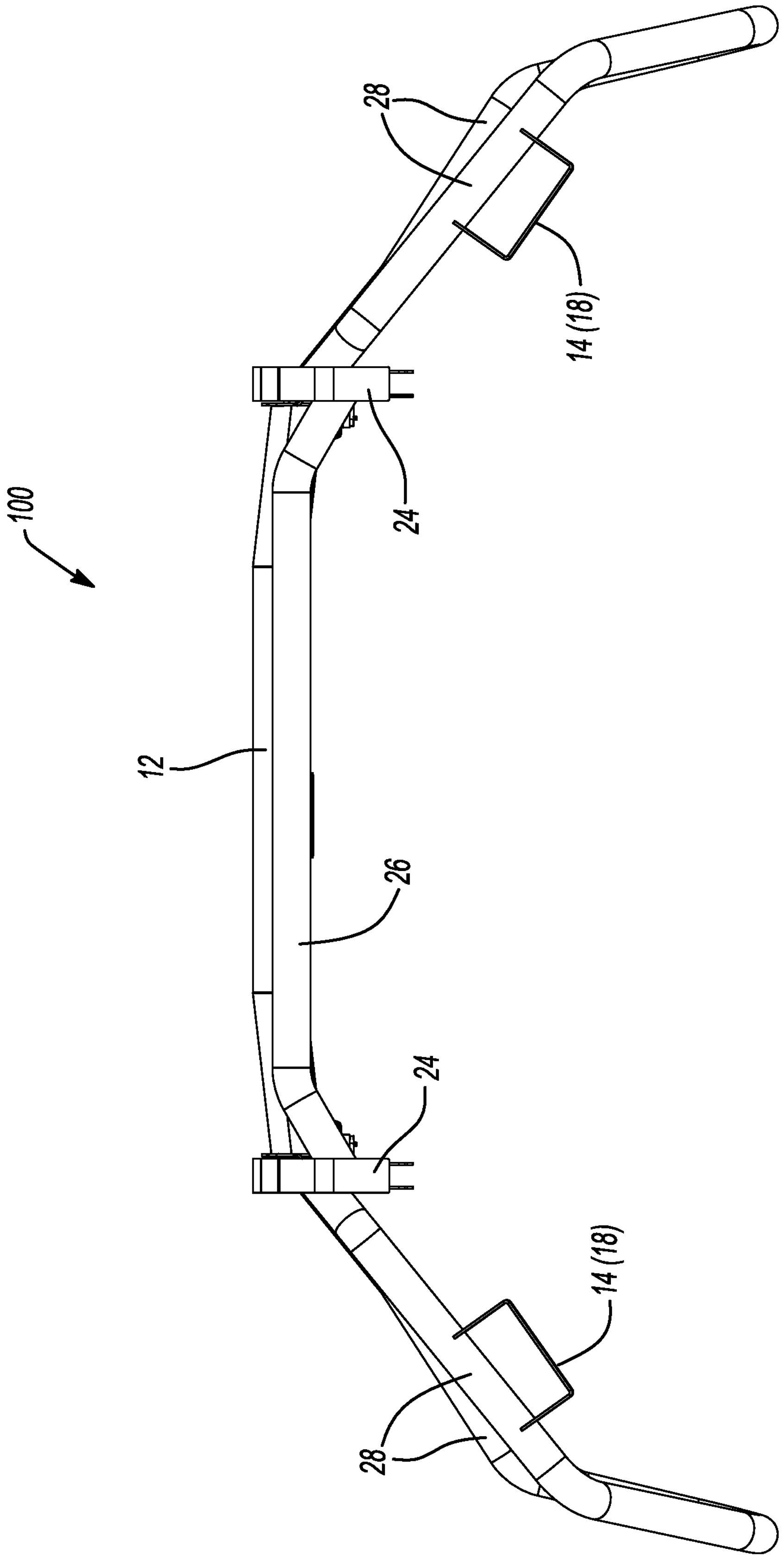
FIG. 18 schematically depicts a bottom view of the grill guard shown in FIG. 4.
Figures 19, 20:
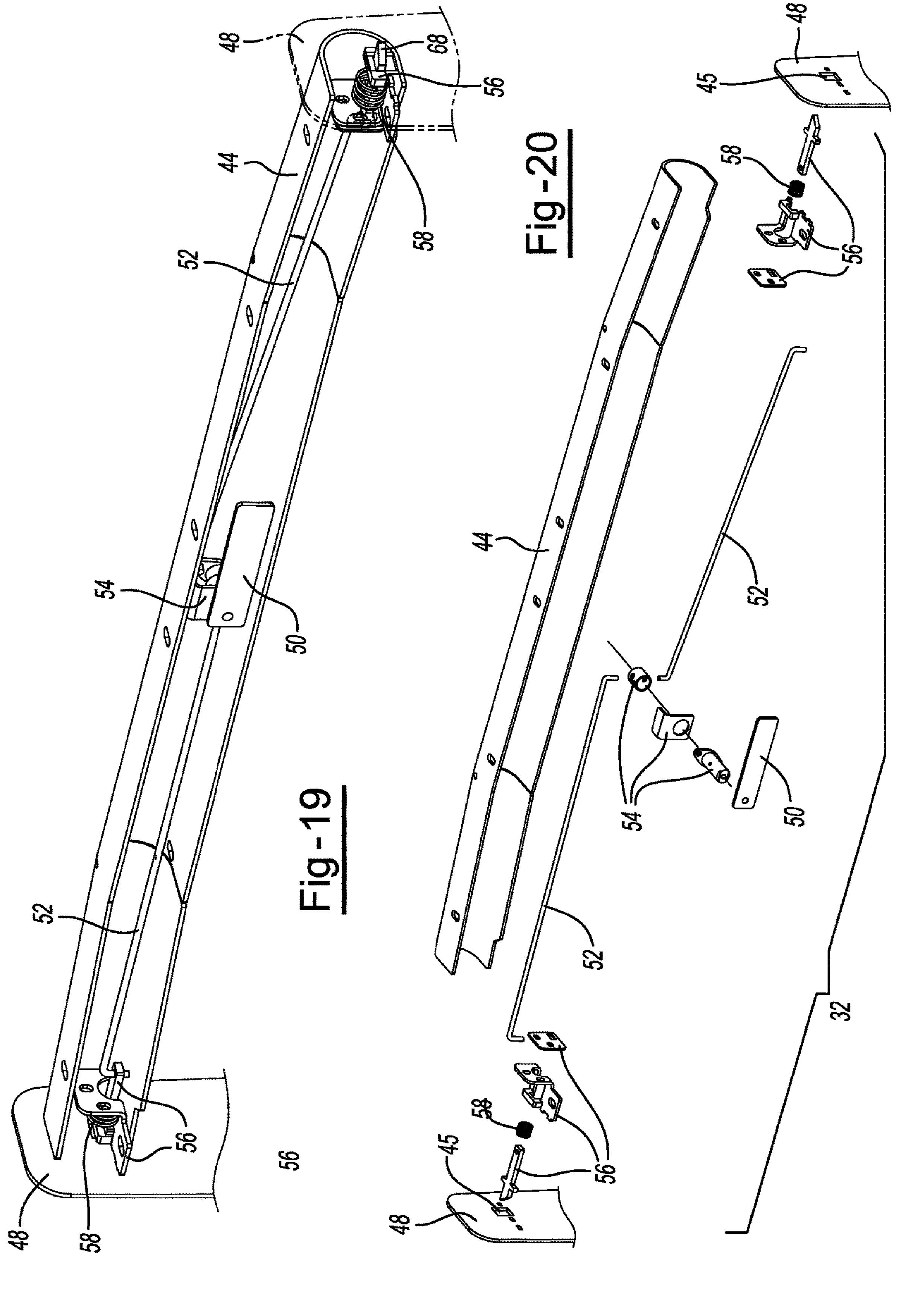
FIG. 19 schematically depicts a cross sectional view of a portion of the center assembly shown in FIG. 6.
FIG. 20 schematically depicts an exploded sectional view of the same portion of the center assembly as shown in FIG. 19.
Figure 21:
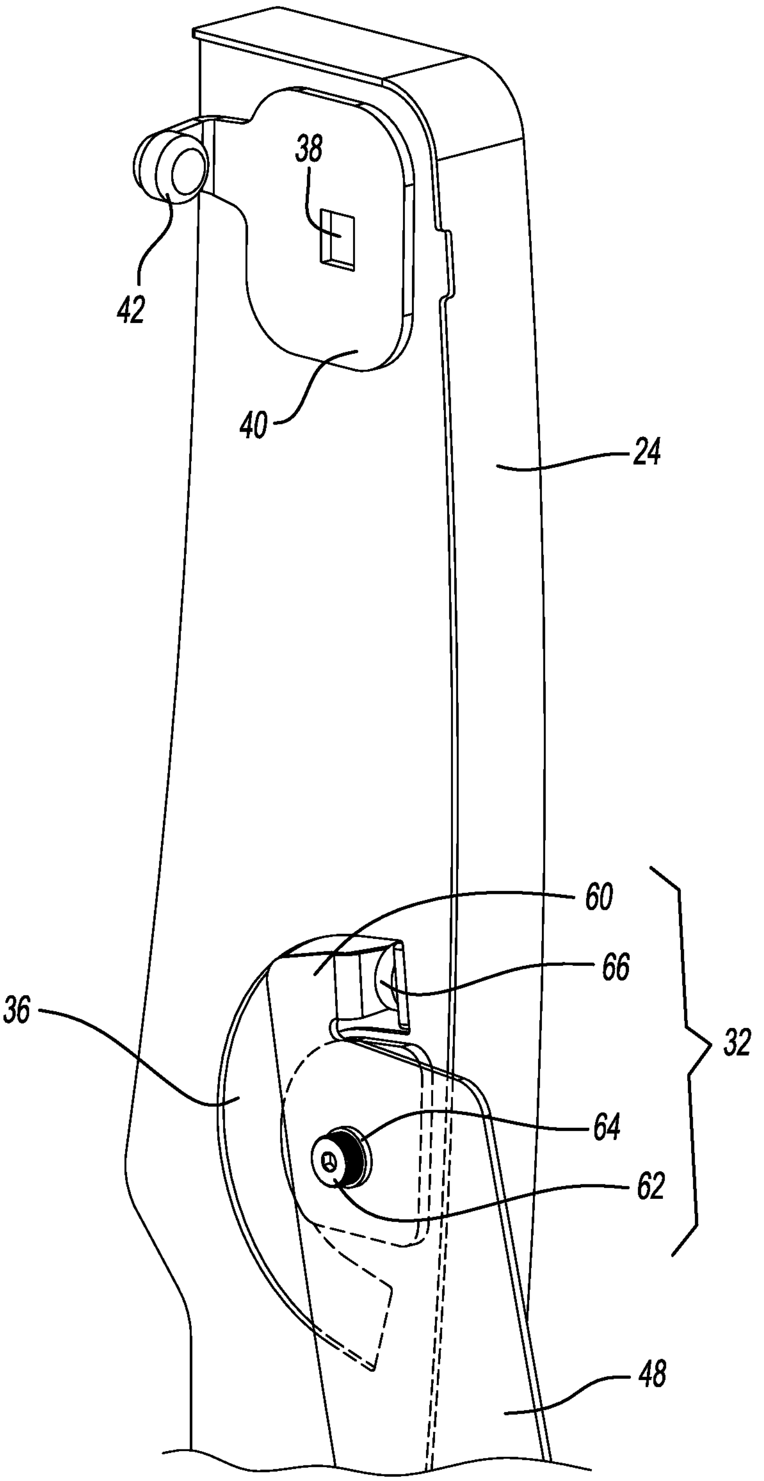
FIG. 21 schematically depicts another portion of the center assembly as shown in FIG. 1.

In one exemplary embodiment and referring to FIG. 21, the latching features 34 of the structural members 24 includes latching apertures 38 and optionally latching interface 40 having bumpers 42. The bumpers 42 can be constructed out of rubber or other suitable art-closed material. Referring to FIG. 6, the center structural frame 30 includes a latching member 44, non-latching member(s) 46, and pivot member(s) 48. Referring to FIGS. 19-21, the latching assembly 32 includes a linkage handle 50, linkage rods 52, a latch pivot link 54, sliding latches 56, return springs 58, and the pivot interfaces 60 having pivot bolts 62, pivot bushings 64, and pivot bumpers 66. The pivot bolts 62 are housed in the pivot bushings 64. The pivot interfaces 60 are adapted to interface with the corresponding pivot features 36 of the structural members 24 as shown in FIG. 21.

Figure 5:
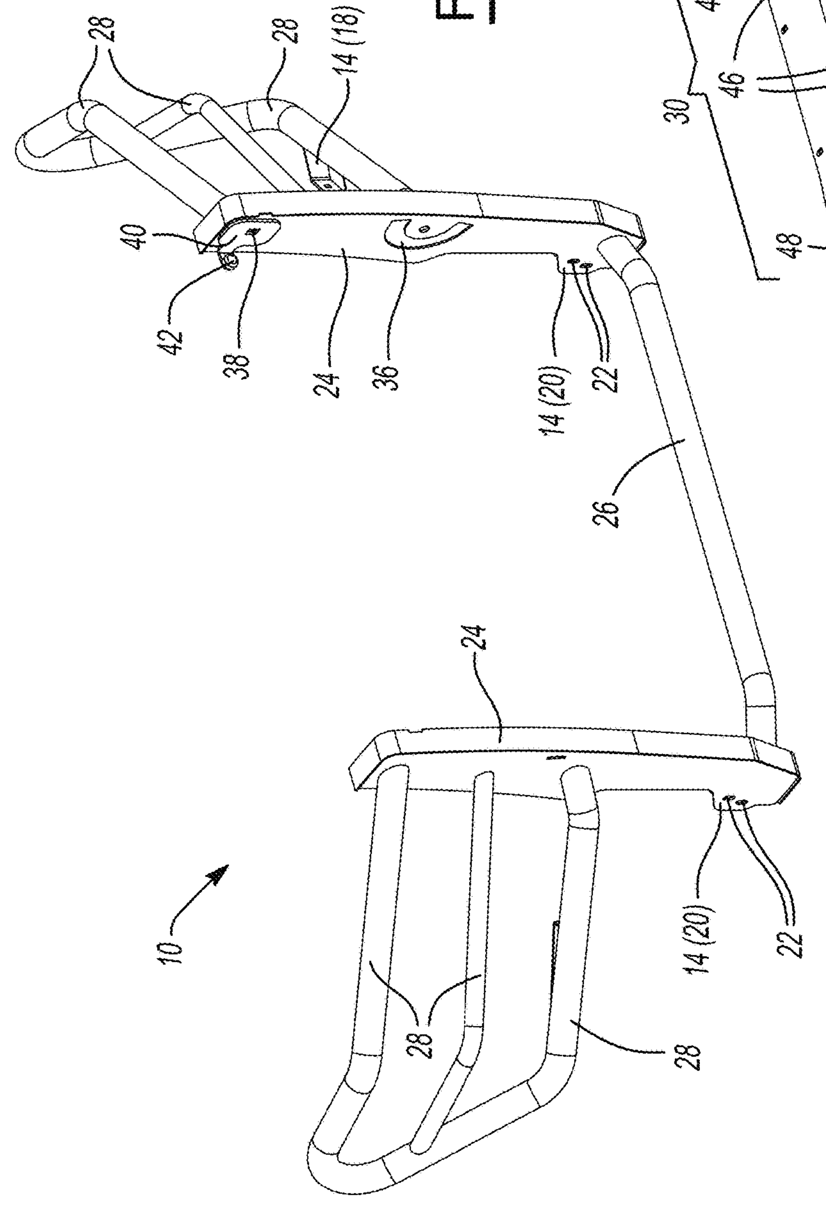
FIG. 5 schematically depicts a front perspective view of the grill structural frame of the grill guard shown in FIG. 4.

In one exemplary embodiment, the pivot features 36 are cutouts of the structural member 24 that are in a generally semi-circular shape as shown in FIGS. 5 and 21. This shape allows the pivot interfaces 60 and their pivot bumpers 66 to easily pivot up and down during the transition process of the center assembly 12 between the non-released configuration and the released configuration.

Referring to FIGS. 19-20, the linkage handle 50, the linkage rods 52, the latch pivot link 54, the sliding latches 56 and the return springs 58 are preferably housed in the latching member 44. The latching member 44 includes latching apertures 45 configured to interface with the sliding latches 56 as shown in FIGS. 19-20. The sliding latches 56 are loaded with the corresponding return springs 58. The linkage handle 50 is fixedly attached to the latch pivot link 54. The latch pivot link 54 is configured to allow the linkage handle 50 to rotate and pull on the linkage rods 52 to activate the transition process of having the center assembly 12 going from the non-released configuration to the released configuration. During this releasing process, the pulling of the linkage rods 52 would in turn pull on the spring-loaded sliding latches 56 until the pressure of the return springs 58 are overcame thereby allowing the center assembly 12 to pivot in a downward direction aided by the interaction between the pivot interfaces 60 (e.g., movements of the pivot bolts 62 and the pivot bumpers 66) and the pivot features 36 of the structural members 24. While the center assembly 12 is pivoting in the downward direction, it can also move in a forward direction.

To activate the transition process of having the center assembly 12 going from the released configuration to the non-released configuration, the center assembly 12 is moved in an upward direction until the sliding latches 56 are engaged and retained by the latching features 34 of the structural frame 24. This upward movement is assisted by the interaction between the pivot interfaces 60 (e.g., movements of the pivot bolts 62 and the pivot bumpers 66) and the pivot features 36 of the structural members 24. While the center assembly 12 is pivoting in the upward direction, it can also move in a backward direction. In one exemplary embodiment, end portions 68 of the sliding latches 56 are retained by the latching apertures 38 of the latching features 34 as shown in FIG. 19.

The latching assembly 32 can alternatively be configured with other art-disclosed components as long as it fulfills the functions described above.

The above-described components of the grill guard 100 of the present invention may be constructed out of any suitable art-disclosed material. Examples of such material are steel including but are not limited to stainless steel, cold rolled steel, mild steel, high strength steel, tempered steel, aluminum, and other metal alloys. The thickness of each individual component may vary. The exact size and shape of the grill guard 100 will vary depending on the configuration of the vehicle 18, and the locations available within the vehicle's frame for mounting of the grill guard 100.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

What is claimed is:

1. A grill guard for a vehicle comprising a grill structural frame and a releasably fold down center assembly having a center structural frame and a latching assembly wherein:

a) the grill guard is attached to front of the vehicle by the grill structural frame;

b) the center assembly is attached to the grill structural frame and can be released and folded down by the latching assembly while the grill structural frame remains fixed in its original location attached to the front of the vehicle;

c) the grill structural frame is comprised of two structural members connected to a grill member;

d) each of the two structural members includes at least one latching feature and at least one pivot feature; and e) the latching assembly is configured to releasably engage with the latching features and the pivot features of the two structural members;

f) when the center assembly is in a non-released configuration, the center assembly is retained by the latching assembly's engagement with the latching features of the structural members;

g) when the center assembly is in a released configuration, the latching assembly is released from the latching features and with the assistance of the pivot features; and h) the latching assembly includes a linkage handle, linkage rods, a latch pivot link, sliding latches, return springs, and pivot interfaces, wherein each of the pivot interfaces includes a pivot bolt, a pivot bushing, and a pivot bumper.

2. The grill guard of claim 1 wherein:

a) the linkage handle is fixedly attached to the latch pivot link;

b) the latch pivot link is configured to allow the linkage handle to rotate and pull on the linkage rods to activate a releasing process of having the center assembly going from a non-released configuration to a released configuration; and b) during the releasing process, pulling of the linkage rods causes pulling of the sliding latches until pressure of the return springs are overcame thereby allowing the center assembly to pivot in a downward direction aided by interaction between the pivot interfaces and the pivot features.

3. The grill guard of claim 2 wherein:
a) the center assembly can change from the released configuration to the non-released configuration by being moved in an upward direction until the sliding latches are engaged and retained by the latching features; and
b) the movement of the center assembly in the upward direction is assisted by interaction between the pivot interfaces and the pivot features.

4. A grill guard for a vehicle comprising a grill structural frame and a releasably fold down center assembly having a center structural frame and a latching assembly wherein:
a) the grill guard is attached to front of the vehicle by the grill structural frame;
b) the center assembly is attached to the grill structural frame and can be released and folded down by the latching assembly while the grill structural frame remains fixed in its original location attached to the front of the vehicle;
c) the grill structural frame includes two structural members and a grill member wherein the two structural members are connected to the grill member;
d) each of the two structural members includes at least one latching feature and at least one pivot feature;
e) the latching assembly includes a linkage handle, linkage rods, a latch pivot link, sliding latches, return springs, and pivot interfaces;
f) the sliding latches are loaded with the return springs; and
g) each of the pivot interfaces includes a pivot bolt, a pivot bushing, and a pivot bumper.

5. The grill guard of claim 4 wherein the grill guard is attached to the front of the vehicle by vehicle mounting features of the grill structural frame and the vehicle mounting features includes mounting brackets.

6. The grill guard of claim 4 wherein the grill structural frame further includes side wing structures.

7. The grill guard of claim 4 wherein
a) the latching assembly is configured to releasably engage with the latching features and the pivot features of the two structural members;
b) when the center assembly is in a non-released configuration, the center assembly is retained by the latching assembly's engagement with the latching features of the structural members; and
c) when the center assembly is in a released configuration, the latching assembly is released from the latching features and with the assistance of the pivot features.

8. The grill guard of claim 4 wherein the at least one latching feature include a latching aperture, a latching interface having a bumper.

9. The grill guard of claim 4 wherein the center structural frame includes a latching member, one or more non-latching members, and pivot members.

10. The grill guard of claim 4 wherein:
a) the linkage handle is fixedly attached to the latch pivot link;
b) the latch pivot link is configured to allow the linkage handle to rotate and pull on the linkage rods to activate a releasing process of having the center assembly going from a non-released configuration to a released configuration; and
c) during the releasing process, pulling of the linkage rods causes pulling of the sliding latches until pressure of the return springs are overcame thereby allowing the center assembly to pivot in a downward direction aided by interaction between the pivot interfaces and the pivot features.

11. The grill guard of claim 10 wherein:
a) the center assembly can change from the released configuration to the non-released configuration by being moved in an upward direction until the sliding latches are engaged and retained by the latching features; and
b) the movement of the center assembly in the upward direction is assisted by interaction between the pivot interfaces and the pivot features.

12. The grill guard of claim 1 wherein the at least one pivot feature is a semi-circular cutout.

* * * * *